(12) United States Patent
Massoud et al.

(10) Patent No.: US 11,061,113 B2
(45) Date of Patent: Jul. 13, 2021

(54) METHOD AND APPARATUS FOR OBJECT DETECTION SYSTEM

(71) Applicant: HUAWEI TECHNOLOGIES CO., LTD., Guangdong (CN)

(72) Inventors: Ali Ahmed Ali Massoud, Kanata (CA); Zhiping Jiang, Kanata (CA); Hongbiao Gao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/037,844

(22) Filed: Sep. 30, 2020

(65) Prior Publication Data

US 2021/0011125 A1    Jan. 14, 2021

Related U.S. Application Data

(63) Continuation of application No. PCT/CN2019/095786, filed on Jul. 12, 2019.

(51) Int. Cl.
  *G01S 7/41* (2006.01)
  *G01S 13/04* (2006.01)
  (Continued)

(52) U.S. Cl.
  CPC .............. *G01S 7/414* (2013.01); *G01S 13/04* (2013.01); *G01S 7/2927* (2013.01); *G01S 13/5246* (2013.01)

(58) Field of Classification Search
  CPC .. G01S 13/5246; G01S 7/2927; G01S 7/2922; G01S 13/5244; G01S 7/414;
  (Continued)

(56) References Cited

U.S. PATENT DOCUMENTS

| | | | | |
|---|---|---|---|---|
| 3,995,270 A | * | 11/1976 | Perry | G01S 7/2922 342/93 |
| 4,649,394 A | * | 3/1987 | Minker | G01S 7/2927 342/93 |

(Continued)

FOREIGN PATENT DOCUMENTS

| | | | |
|---|---|---|---|
| CA | 2535058 A1 | 6/2007 | |
| CN | 102098074 A | 6/2011 | |
| EP | 2003470 A1 * | 12/2008 | ......... G01S 13/5246 |

OTHER PUBLICATIONS

Sung et al., "Performance Analysis of an Environmental Adaptive CF AR Detector", Hindawi Publishing Corporation Mathematical Problems in Engineering, May 14, 2014, pp. 1-7.

(Continued)

*Primary Examiner* — Olumide Ajibade Akonai
(74) *Attorney, Agent, or Firm* — BCF LLP

(57) ABSTRACT

The disclosed systems, structures, and methods are directed to an object detection system, employing a receiver configured to receive a signal reflected from an object, an analog-to-digital converter (ADC) configured to convert the received signal into a digital signal, a pre-processor configured to improve a signal-to-noise (SNR) of the digital signal and to generate a pre-processed signal corresponding to the digital signal, a parameter extractor configured to calculate a number of reference cells M and a multiplication factor $K_0$, and a Constant False Alarm Rate (CFAR) processor configured to analyze a cell-under-test (CUT) and M reference cells in accordance with the number of reference cells M and the multiplication factor $K_0$ to detect the presence of the object.

16 Claims, 14 Drawing Sheets

(51) Int. Cl.
*G01S 13/524* (2006.01)
*G01S 7/292* (2006.01)

(58) Field of Classification Search
CPC ........ G01S 13/931; G01S 7/292; G01S 13/04; G01S 2007/358
USPC .......................................................... 342/93
See application file for complete search history.

(56) References Cited

U.S. PATENT DOCUMENTS

| | | | | |
|---|---|---|---|---|
| 5,703,592 | A * | 12/1997 | Watts | G01S 7/2927 342/159 |
| 5,808,579 | A * | 9/1998 | Rademacher | G01S 7/295 342/159 |
| 9,726,758 | B2 * | 8/2017 | Moon | G01S 7/2923 |
| 2013/0201054 | A1 * | 8/2013 | Wang | G01S 13/04 342/93 |
| 2018/0275259 | A1 * | 9/2018 | Ott | G01S 13/5246 |

OTHER PUBLICATIONS

Balakhder, Ahmed Mohanmmed "Intelligent Approach to Improve Standard CFAR Detection in non-Gaussian Sea Clutter", Retrieved from the InternetURL: http://rave.ohiolink.edu/etdc/view?acc_num=osu1440066096>, Dec. 31, 2015, total 89 pages.

International Search Report of PCT/CN2019/095786; Na Li, dated Apr. 17, 2020.

Rickard et al., "Adaptive detection algorithms for multiple-target situations", IEEE Trans. Aerosp. Electron. Syst., vol. 13, pp. 338-343, 1977.

Himonas et al., "Automatic censored CFAR detection for nonhomogeneous environments", IEEE Trans. Aerosp. Electron. Syst., vol. 28, No. 1, pp. 286-304, 1992.

Kim et al., "Generalized OS CFAR detector with noncoherent integration", Signal Process., vol. 31, No. 1, pp. 43-56, 1993.

Smith et al., "Intelligent CFAR processor based on data variability", IEEE Trans. Aerosp. Electron. Syst., vol. 36, pp. 837-847, 2000.

Farrouki et al., "Automatic censoring CFAR detector based on ordered data variability for nonhomogeneous environments", IEE Radar Sonar Navig., vol. 15, No. 2, pp. 43-51, 2005.

Barkat et al., "Adaptive cell-averaging CFAR detection in distributed sensor networks", IEEE Transactions on Aerospace and Electronic Systems, vol. 27, No. 3, May 1991, 424-429.

Lin et al., "Decision fusion rules in multihop wireless sensor networks", IEEE Transactions on Aerospace and Electronic Systems, vol. 41, No. 12, Apr. 2005, pp. 475-488.

Gini et al., "Selected list of references on radar signal processing", IEEE Trans. Aerospace and electronic Systems., vol. 29, No. 1, pp. 329-360, Jan. 2001.

Zhao et al, "A new CFAR detector based on ordered data variability", Proceedings of the International Conference on Innovative Computing, Information and Control (ICICIC'06), 2006.

Hong et al., "Performance analysis of an environmental adaptive CFAR detector", Hindawi Publishiing Corporation, Mathematical Problems in Engineering, vol. 2014, 2014, Article ID 615704.

Magaz et al., "Automatic threshold selection in OS-CFAR radar detection using information theoretic criteria", Progress In Electromagnetics Research B, vol. 30, pp. 157-175, 2011.

* cited by examiner

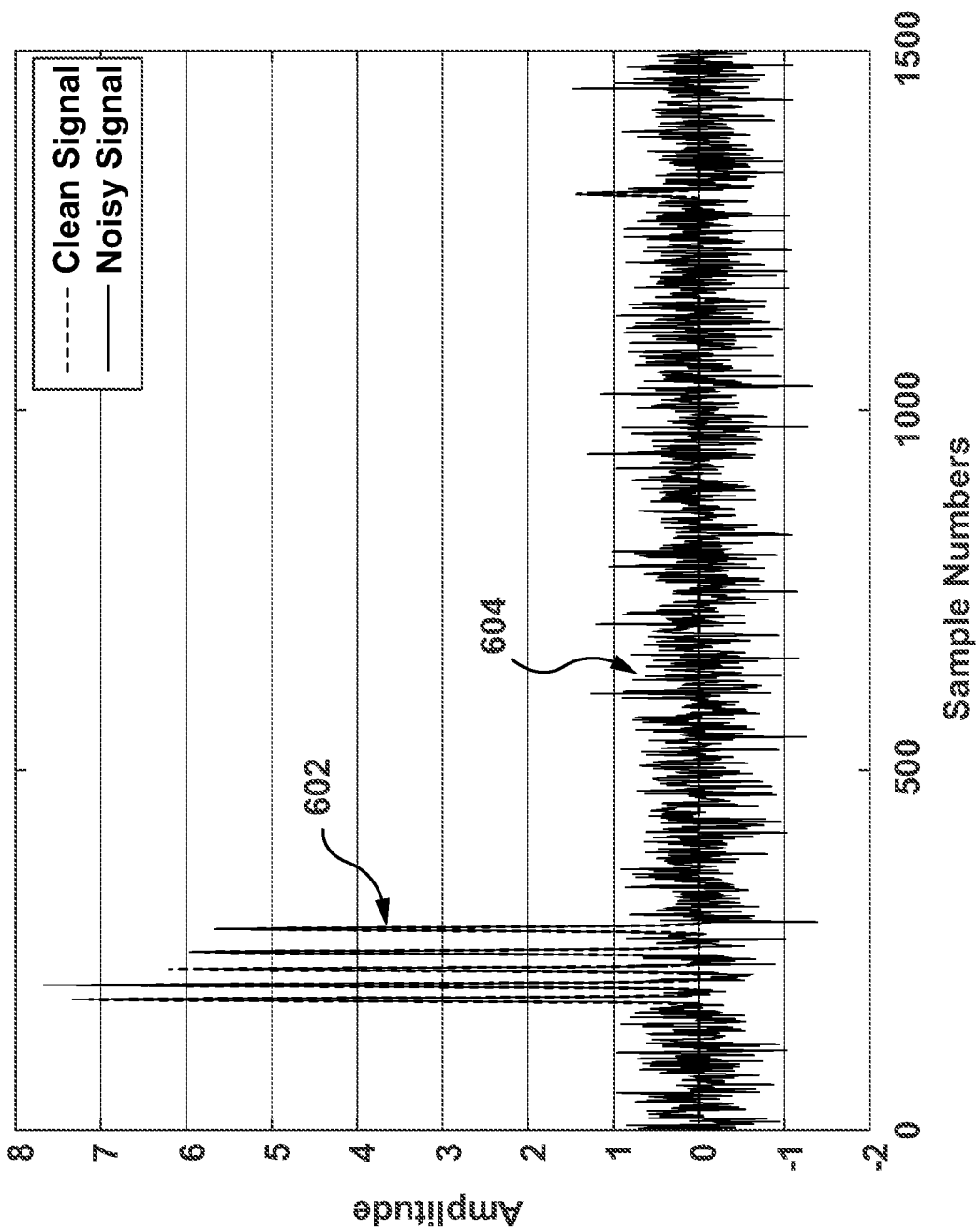

METHOD AND APPARATUS FOR OBJECT DETECTION SYSTEM

CROSS-REFERENCE TO RELATED APPLICATIONS

This application claims priority to previously-filed PCT Application No. PCT/CN2019/095786 entitled "METHOD AND APPARATUS FOR OBJECT DETECTION SYSTEM," filed on Jul. 12, 2019, the contents of which are incorporated herein by reference.

FIELD OF THE INVENTION

The present disclosure generally relates to the field of signal processing and, in particular, to object detection system.

BACKGROUND

Typically, object-detection systems such as radio detection and ranging (RADAR) systems, sound navigation and ranging (SONAR) systems, or light imaging detection and ranging (LIDAR) systems comprise a receiver configured to operate on a specific type of signal detection ranging from radio signals, acoustic signals or light signals etc. These signals are transmitted by a transmitter usually synchronized with a receiver. The interaction between an object and the transmitted signal produces an echo and the receiver is configured to receive and decode such echoes from the objects. The receiver uses several variables to decode the echoes, such variables include the delay between transmitted signal and the arrival of the echo reflected by an object, the strength of the received echo etc.

Echoes from the objects which are not considered as targets (clutter) and echoes from background, such as reflections from background surfaces (noise), produce unwanted signals in the receiver, and may generate false alarms, i.e. false detections of presence or absence of objects.

Detecting the echoes has two main challenges. The first challenge is to maximize a signal-to-noise ratio (SNR) of the received echo and the second challenge is to use an appropriate threshold technique for proper detection of objects. The main aim of setting a detection threshold is maximizing a probability of detection and reducing a probability of false alarm.

Existing solutions to overcome the above discussed challenges include Constant False Alarm Rate (CFAR) threshold techniques that have been applied to various object-detection systems. Unlike a constant threshold, the CFAR threshold technique is used to set the detection threshold by locally estimating an average power level of the noise in a predefined interval. The length of this interval is fixed and determined by a constant number of reference cells around a cell-under-test (CUT).

To avoid corrupting the estimate of noise level, cells immediately adjacent to the CUT, also known as guard cells, are typically ignored for the average power calculation. An object is detected in the CUT if the power level of CUT is both greater than power levels of adjacent cells and greater than the calculated average power level.

As such, echoes from objects located at a distant location have a low SNR, therefore to detect such objects the number of the reference cells should be large. However setting the number of reference cells to be large results in a poor spatial resolution. Therefore, it may not detect some or all the objects that are closely spaced even in the case of short distance objects with high SNR.

SUMMARY

An object of the present disclosure is to provide an object detection system. The disclosure presented herein employs a receiver configured to receive a signal reflected from an object, an analog-to-digital converter (ADC) configured to convert the received signal into a digital signal, a pre-processor configured to improve a signal-to-noise (SNR) of the digital signal and to generate a pre-processed signal corresponding to the digital signal, a parameter extractor configured to calculate a number of reference cells M and a multiplication factor $K_0$, and a Constant False Alarm Rate (CFAR) processor configured to analyze a cell-under-test (CUT) and M reference cells in accordance with the number of reference cells M and the multiplication factor $K_0$ to detect the presence of the object.

In accordance with other aspects of the present disclosure the object detection system, wherein the pre-processor further comprising a low-pass filter and a square-law detector.

In accordance with other aspects of the present disclosure the object detection system, wherein the parameter extractor further comprises a SNR calculation module configured to compute a SNR corresponding to the received signal, a probability of detection calculation module configured to compute a probability of detection $P_d$ in accordance with the SNR and a probability of false alarm $P_{fa}$, a number of reference cells M calculation module configured to compute the number of reference cells M in accordance with the probability of detection $P_d$, the probability of false alarm $P_{fa}$ and the SNR, and a multiplication factor $K_0$ calculation module configured to compute the value of the multiplication factor $K_0$ in accordance with the probability of false alarm, SNR and the number of reference cells M.

In accordance with other aspects of the present disclosure the object detection system, wherein the CFAR processor further comprises a plurality of averaging modules configured to compute an average power $P_A$ corresponding to the M reference cells, a mixer configured to mix the average power $P_A$ with the multiplication factor $K_0$ and to generate a threshold value $K_0 P_A$, and a comparator configured to compare the threshold value $K_0 P_A$ with a power $P_C$ corresponding to the CUT.

In accordance with other aspects of the present disclosure the object detection system, wherein the CFAR processor further comprises a controller configured to supply at least M+3 samples associated with the pre-processed signal to a moving window.

In accordance with other aspects of the present disclosure the object detection system, wherein the controller is further configured to provide the multiplication factor $K_0$ to the mixer.

In accordance with other aspects of the present disclosure, there is provided a method implemented in an object detection system. The disclosure presented herein performs, receiving a signal reflected from an object, converting the received signal into a digital signal, pre-processing the digital signal and generating a pre-processed signal corresponding to the digital signal, calculating a number of reference cells M and a multiplication factor $K_0$, and analyzing a cell-under-test (CUT) and M reference cells in accordance with the number of reference cells M and the multiplication factor $K_0$ to detect the presence of the object.

In accordance with other aspects of the present disclosure, the method implemented in the object detection system, wherein the pre-processing of the digital signal includes filtering.

In accordance with other aspects of the present disclosure, the method implemented in the object detection system, wherein the pre-processing of the digital signal includes processing the digital signal in a square-law detector.

In accordance with other aspects of the present disclosure, the method implemented in the object detection system, wherein calculating the number of reference cells M and the multiplication factor $K_0$ further comprises computing a signal-to-noise (SNR) corresponding to the received signal, computing a probability of detection $P_d$ in accordance with the SNR and a probability of false alarm $P_{fa}$, computing the number of reference cells M in accordance with the probability of detection $P_d$, probability of false alarm $P_{fa}$ and SNR, and computing the value of the multiplication factor $K_0$ in accordance with the probability of false alarm, SNR and the number of reference cells M.

In accordance with other aspects of the present disclosure, the method implemented in the object detection system, wherein the number of reference cells M is computed according to the following relationship:

$$P_d = \left[1 + \frac{\left(P_{fa}^{\frac{-1}{M}} - 1\right)}{(1 + SNR)}\right]^{-M}$$

In accordance with other aspects of the present disclosure, the method implemented in the object detection system, wherein a first order solution for the number of reference cells M is given by:

$$M = \frac{(\ln P_{fa})^2}{2(\ln P_{fa} - (1 + SNR)\ln P_d)}$$

In accordance with other aspects of the present disclosure, the method implemented in the object detection system, wherein a second order solution for the number of reference cells M is given by:

$$M = \frac{2}{\frac{3}{\ln P_{fa}} + \sqrt{\left(\frac{3}{\ln P_{fa}}\right)^2 - \frac{24(\ln P_{fa} - (1 + SNR)\ln P_d)}{(\ln P_{fa})^2}}}$$

In accordance with other aspects of the present disclosure, the method implemented in the object detection system, wherein the number of reference cells M is a time varying value.

In accordance with other aspects of the present disclosure, the method implemented in the object detection system, wherein the multiplication factor $K_0$ is computed according to the following relationship:

$$K_0 = M\left(P_{fa}^{\frac{-1}{M}} - 1\right)$$

In accordance with other aspects of the present disclosure, the method implemented in the object detection system, wherein the analyzing the cell-under-test (CUT) and M reference cells further comprises computing an average power $P_A$ corresponding to the M reference cells, mixing the average power $P_A$ with the multiplication factor $K_0$ to generate a threshold value $K_0 P_A$, and comparing the threshold value $K_0 P_A$ with a power $P_C$ corresponding to the CUT.

In accordance with other aspects of the present disclosure, the method implemented in the object detection system, further comprising supplying at least M+3 samples associated with the pre-processed signal to a moving window.

In accordance with other aspects of the present disclosure, the method implemented in the object detection system, further comprising detecting the object if the power $P_C$ is greater than the threshold value $K_0 P_A$.

BRIEF DESCRIPTION OF THE FIGURES

The features and advantages of the present disclosure will become apparent from the following detailed description, taken in combination with the appended drawings, in which:

FIGS. 6a-6c illustrate simulation results corresponding to the digital signal y(n) and various operations performed on the digital signal y(n), in accordance with various embodiments discussed in the present disclosure.

Figure 1:
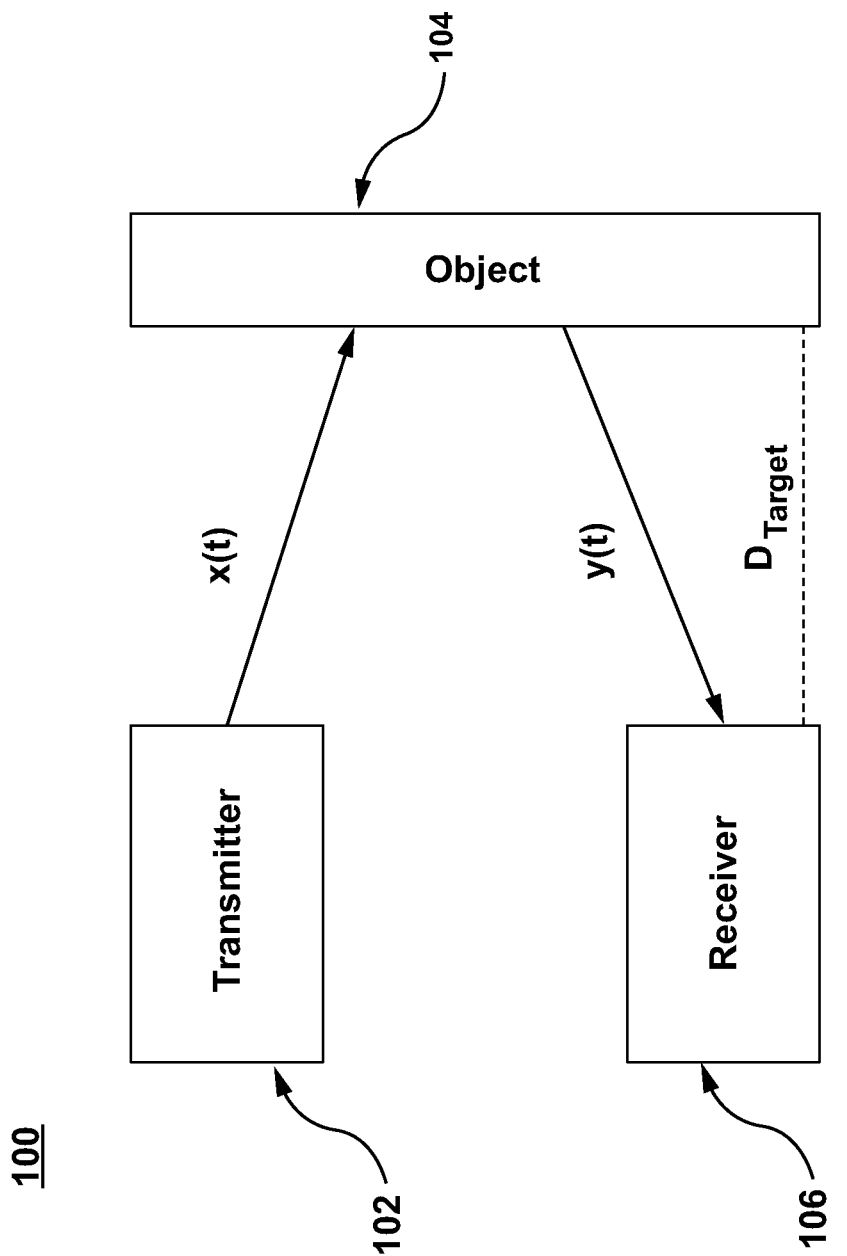
FIG. 1 (Prior Art) depicts a high-level functional block diagram of a conventional object-detection system, directed to detect an object based on received echo.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

FIG. 1(Prior Art) depicts a high-level functional block diagram of a conventional object-detection system 100, directed to detect an object based on received echo. As shown, the conventional object-detection system 100 employs a transmitter 102 and a receiver 106. It will be understood that other elements may be present, but are not illustrated for the purpose of tractability and simplicity.

The transmitter 102 is configured to transmit a signal x(t) to scan various objects in the vicinity and the receiver 106 is configured to receive an echo signal y(t), reflected from an object 104. The received echo signal y(t) may be affected by echoes from objects which are not considered as targets (clutter), echoes from background, such as reflections from background surfaces (noise), or white Gaussian noise with zero mean and produce unwanted signals resulting in a reduced signal-to-noise (SNR).

Figure 2:
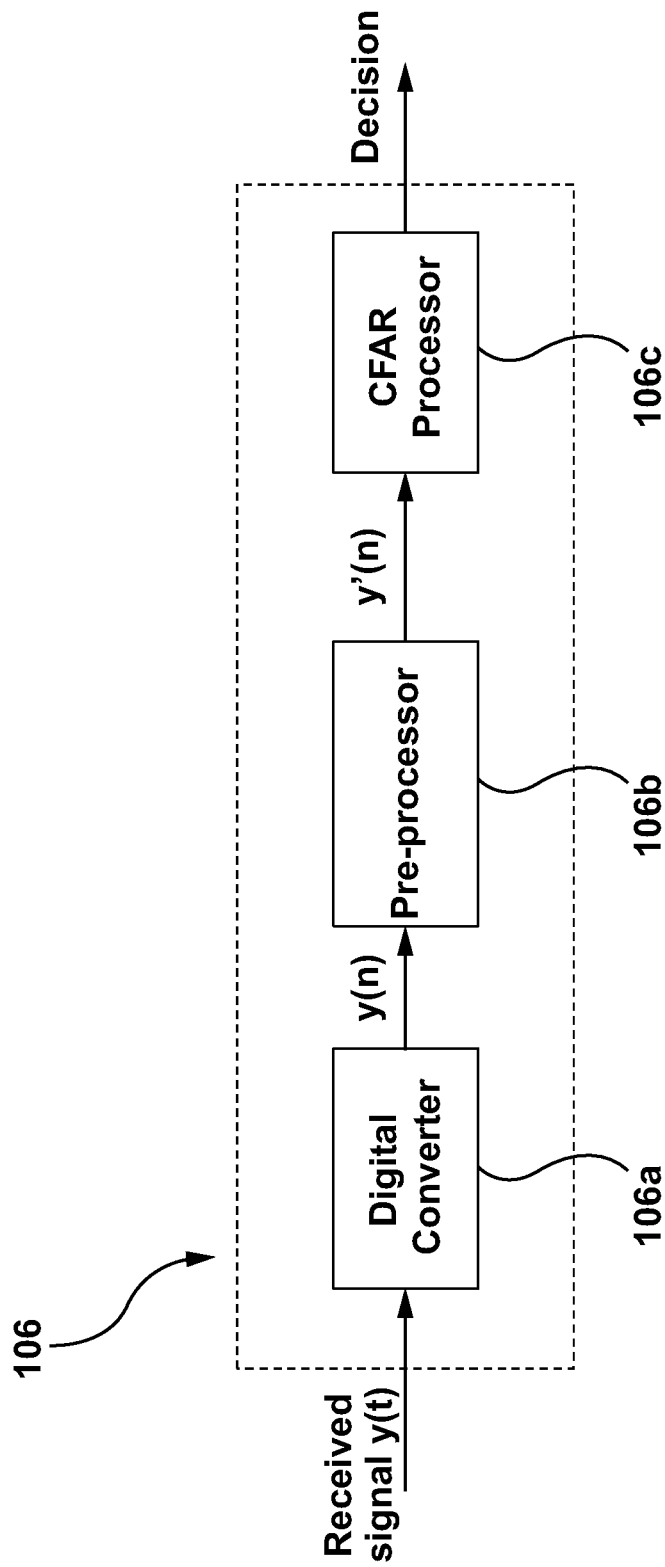
FIG. 2 (Prior Art) illustrates a high-level functional block diagram of a receiver employed in the conventional object-detection system.

The receiver 106 is further configured to process the received echo signal in order to make a decision on object detection. To this end, FIG. 2 (Prior Art) illustrates a high-level functional block diagram of the receiver 106 employed in the conventional object-detection system 100. As shown, the receiver 106 employs a digital converter 106a, a pre-processor 106b, and a Constant False Alarm Rate (CFAR) processor 106. It will be understood that other elements may be present, but are not illustrated for the purpose of tractability and simplicity.

Received signal y(t) is forwarded to the digital converter 106a. The digital converter 106a is configured to convert y(t) into a digital signal y(n). In so doing, the digital converter 106a converts the received signal y(t) into an electrical signal and finally to a digital signal y(n). The digital signal y(n) is then supplied to the pre-processor 106b for filtering and noise removal. To this end, the pre-processor 106b filters the digital signal y(n) and the filtered version of digital signal y(n) is passed through a square law detector (Not Shown) to convert Gaussian distribution nature of noise present in the digital signal y(n) into an exponential distribution and generates a pre-processed signal y'(n).

Pre-processed signal y'(n) is then provided to the CFAR processor 106c. The CFAR processor 106c is configured to process the pre-processed signal y'(n) to detect the presence of objects in the vicinity of conventional object-detection system 100. The CFAR processor 106c operates on a cell-under-test (CUT) and M reference cells around CUT, present in the pre-processed signal y'(n). In so doing, the CFAR processor 106c computes an average power of M reference cells and multiplies the average power of M reference cells with a multiplication factor $K_0$ to calculate a threshold for object detection.

To avoid affecting the estimate of power level, cells immediately adjacent to the CUT, also known as guard cells, are typically ignored for the average power calculation. An object is detected in the CUT if the power level of CUT is both greater than power levels of adjacent cells as well as greater than the calculated average power level.

With this said the receiver 106 uses a constant value M to calculate the value of multiplication factor $K_0$ and eventually the value of the threshold for object detection. The number of the reference cells M should be large enough in order to detect the objects located at a longer distance due to low signal-to-noise ratio (SNR) of the reflected signals. However setting the number of reference cells M to a large number leads to poor spatial resolution. Therefore, the receiver 106 may miss-detect some or all the objects that are closely spaced even in the case of objects located at a shorter distance with high SNR.

Figure 3:
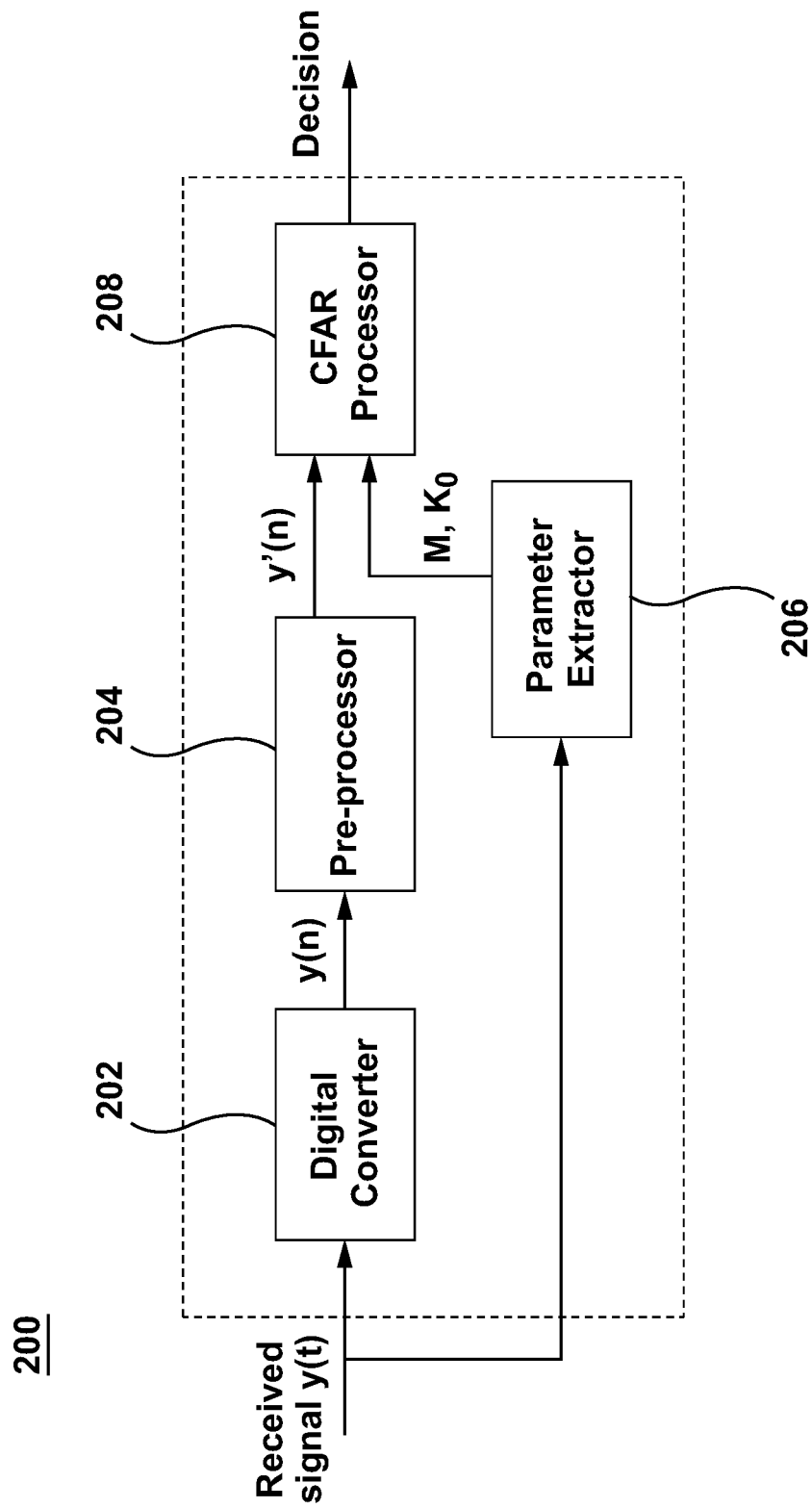
FIG. 3 illustrates a high-level functional block diagram of a receiver, that may be incorporated in the object-detection system, directed to detect an object based on received echo, in accordance with various embodiments discussed in present disclosure.

To this end, FIG. 3 illustrates a high-level functional block diagram of a receiver 200, may be incorporated in object-detection system 100, directed to detect an object based on received echo, in accordance with various embodiments discussed in present disclosure. As shown, the receiver 200 employs a digital converter 202, a pre-processor 204, a parameter extractor 206 and a CFAR processor 208. The CFAR processor 208 is distinct from the CFAR processor 106c of FIG. 2 in that it is adapted to receive and use inputs from the parameter extractor 206. Details of the CFAR processor 208 are provided herein below, in the description of FIG. 8. It will be understood that other elements may be present, but are not illustrated for the purpose of tractability and simplicity.

The receiver 200 is configured to receive an echo signal y(t). The receiver 200 may be configured to operate on various types of signal detection ranging from radio signals, acoustic signals or light signals, etc. The received echo signal y(t) is forwarded to the digital converter 202. The digital converter 202 is configured to convert y(t) into a digital signal y(n). In so doing, the digital converter 202 converts the received signal y(t) into an electrical signal and finally to a digital signal y(n).

Figure 4:
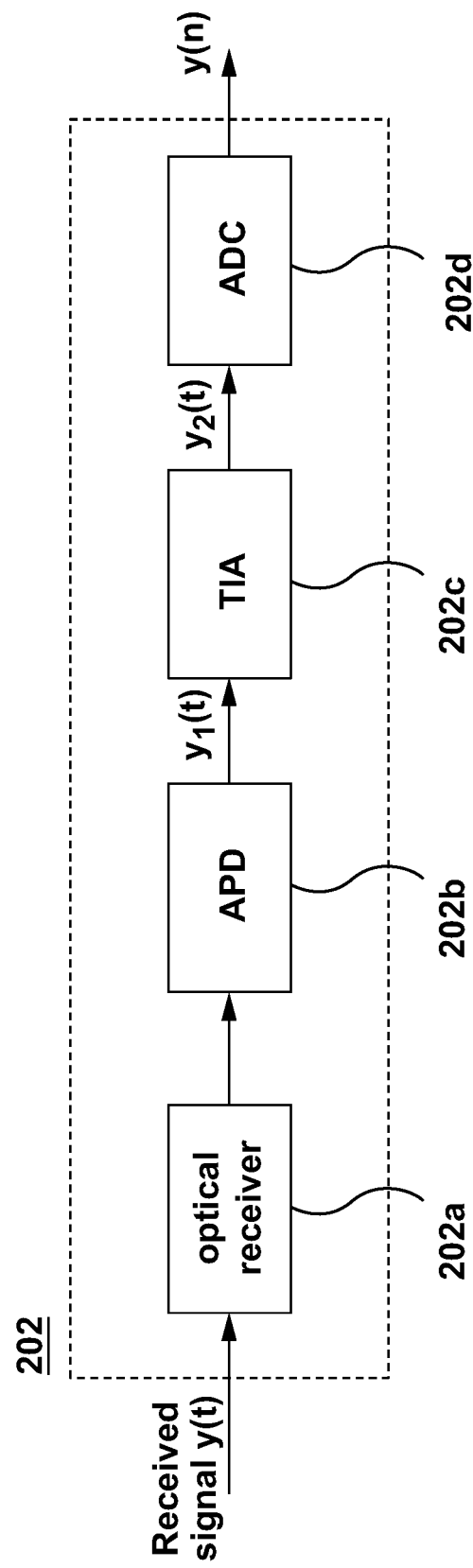
FIG. 4 illustrates a high-level functional block diagram of a digital converter in accordance with certain embodiments where the received signal y(t) is a light signal.

FIG. 4 illustrates a high-level functional block diagram of the digital converter 202 in accordance with certain embodiments where the received echo signal y(t) is a light signal. As shown, the digital converter 202 employs an optical receiver 202a, an avalanche photo diode (APD) 202b, a trans-impedance amplifier (TIA) 202c, and an analog-to-digital converter (ADC) 202d. It will be understood that other elements may be present, but are not illustrated for the purpose of tractability and simplicity.

The optical receiver 202a may be configured to receive the echo signal y(t) reflected from certain objects in the vicinity of receiver. The received echo signal y(t) may be then forwarded to the APD 202b. The APD 202b converts the echo signal y(t) into an electrical signal $y_1(t)$ and supplies the electrical signal $y_1(t)$ to the TIA 202c. The TIA 202c may be configured to amplify electrical signal $y_1(t)$ and provides an amplified electrical signal $y_2(t)$ to the ADC 202d. Finally, the ADC 202d may be configured to convert the amplified electrical signal $y_2(t)$ into a digital signal y(n), corresponding to the received echo signal y(t) and supplies the received the digital signal y(n) to the pre-processor 204 for further processing.

Figure 5:
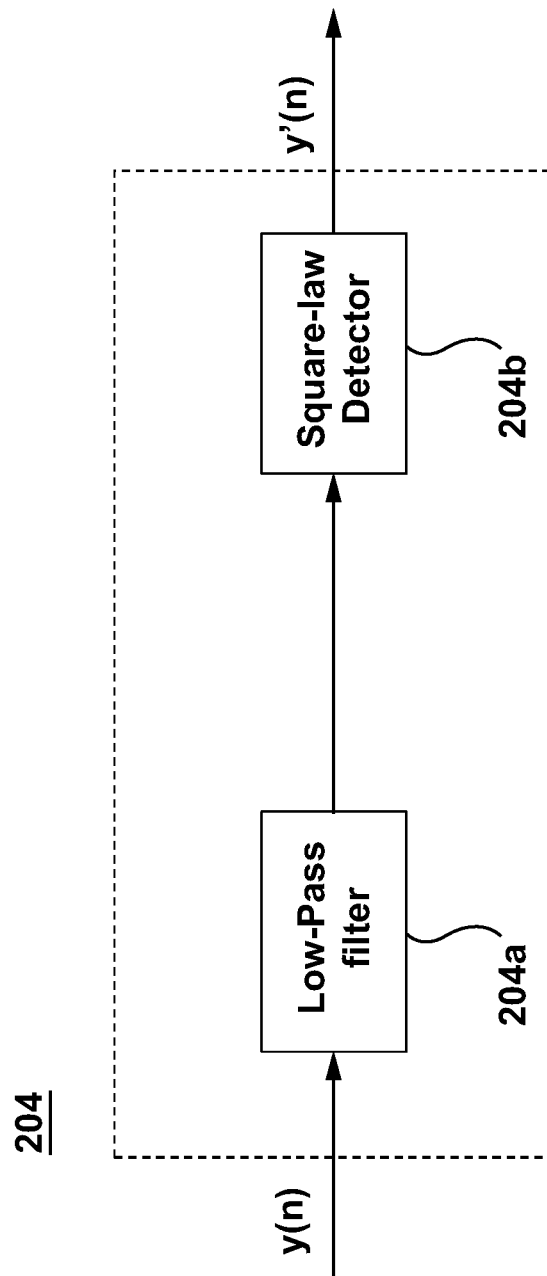
FIG. 5 illustrates a high-level functional block diagram of the pre-processor configured to reduce the effect of noise on the digital signal y(n), in accordance with various embodiments discussed in the present disclosure.

FIG. 5 illustrates a high-level functional block diagram of the pre-processor 204 configured to reduce the effect of noise on the digital signal y(n), in accordance with various embodiments discussed in the present disclosure. As shown, pre-processor 204 employs a low-pass filter (LPF) 204a and a square-law detector 204b. It will be understood that other elements may be present, but are not illustrated for the purpose of tractability and simplicity.

The LPF 204b may be configured to filter the digital signal y(n) as supplied by the ADC 202d. In so doing, LPF 204b may remove the unwanted signals as described above to improve SNR of the digital signal y(n). The filtered version of the digital signal y(n) may be supplied to the square-law detector 204b. The square-law detector 204b may be configured to convert the Gaussian distribution nature of noise into an exponential distribution and provides a pre-processed digital signal y'(n).

Figure 6B:
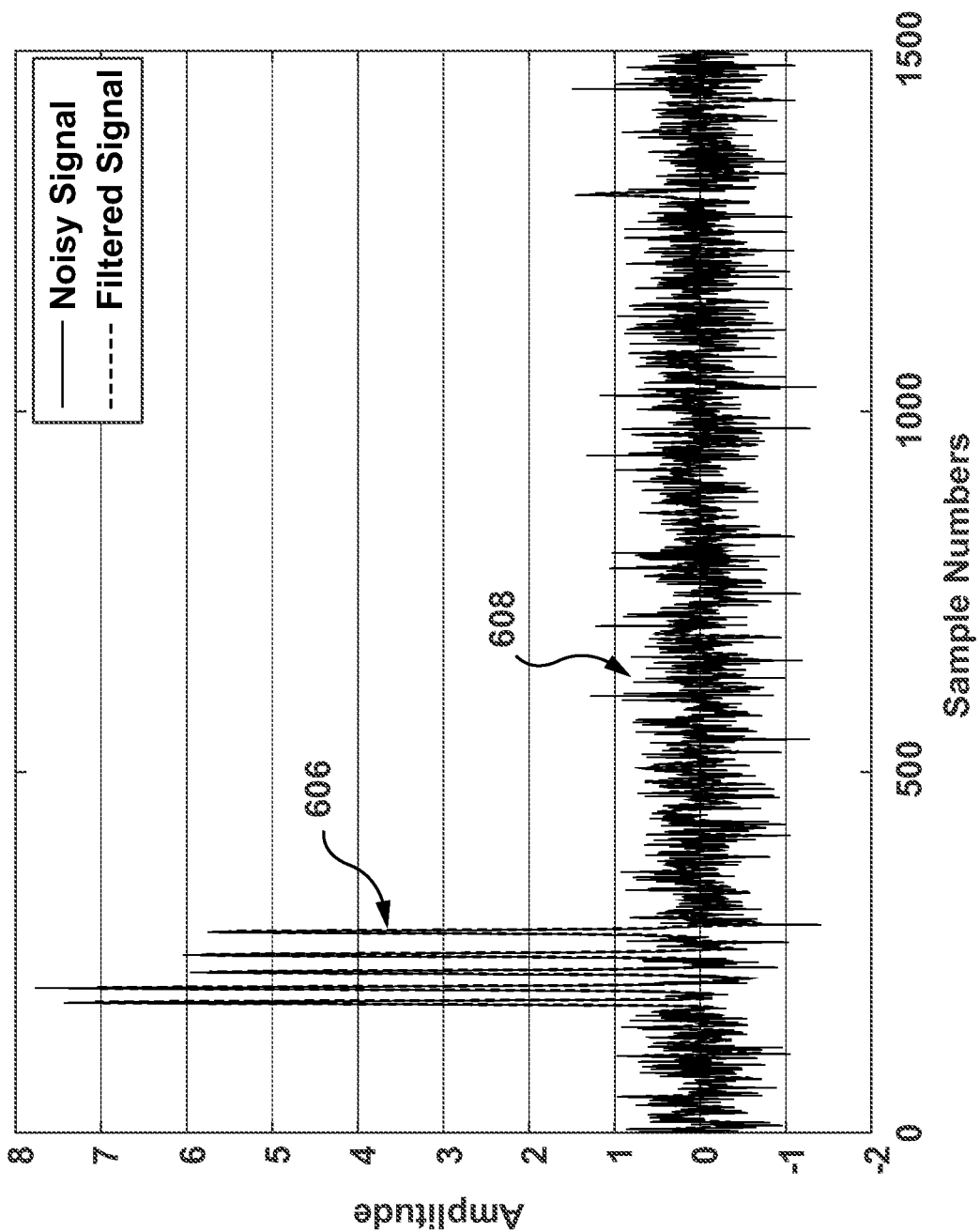
Figure 6C:
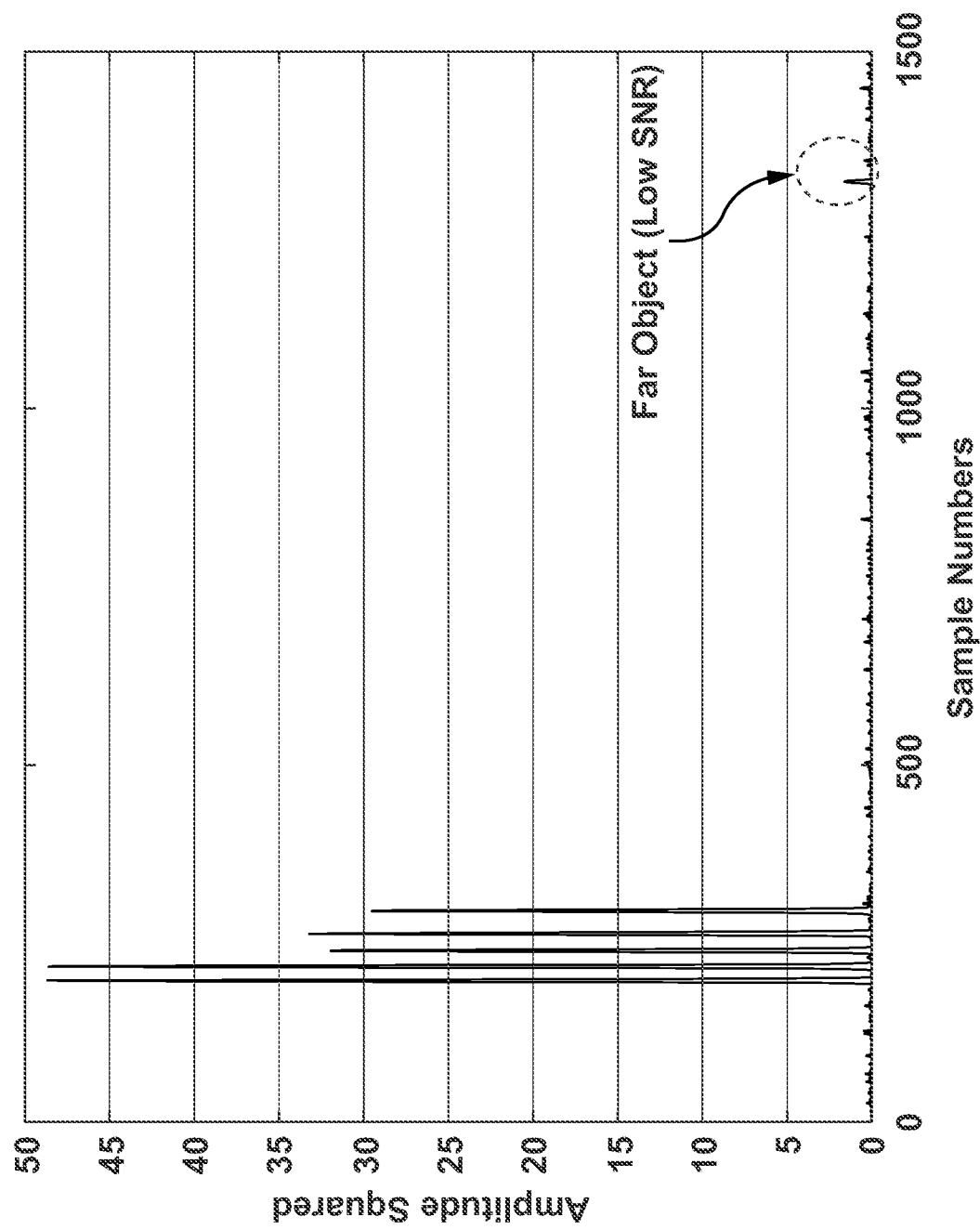

FIGS. 6a-6c illustrate representative simulation results corresponding to the digital signal y(n) and various operations performed on the digital signal y(n), in accordance with various embodiments discussed in the present disclosure. As shown, FIG. 6a illustrates a representative scenario of a returned signal 602 mixed with a noise signal 604 at various instants versus amplitude in volts corresponding to the return signal 602 and the noise signal 604. The simulation contains multiple pulses with significant voltage amplitude i.e. with a high SNR. Such pulses have been received early in time, thereby represent objects closer to the receiver 200. The simulation also contains pulses with less significant voltage amplitude i.e. with a low SNR. Such pulses have been received at later instant, thereby representing objects in located at a longer distance from the receiver 200.

Similarly, FIG. 6b illustrates the output of the LPF 204a corresponding to the digital signal y(n) representing the filtered signal 606 and the filtered noise signal 608. FIG. 6c represents the output y'(n) of the square-law detector 204c corresponding to the filtered version of the digital signal y(n).

Returning to FIG. 3, the pre-processor 204 is further configured to supply the pre-processed digital signal y'(n) to the CFAR processor 208. As shown, the received echo signal y(t) is also forwarded to the parameter extractor 206 for further processing. As such, the parameter extractor 206 is configured to compute a number of reference cells M to be used during evaluation of a CUT. The parameter extractor 206 also computes a value of the multiplication factor $K_0$, to be used by CFAR processor 208, in order to compute a threshold for object detection.

Figure 7:
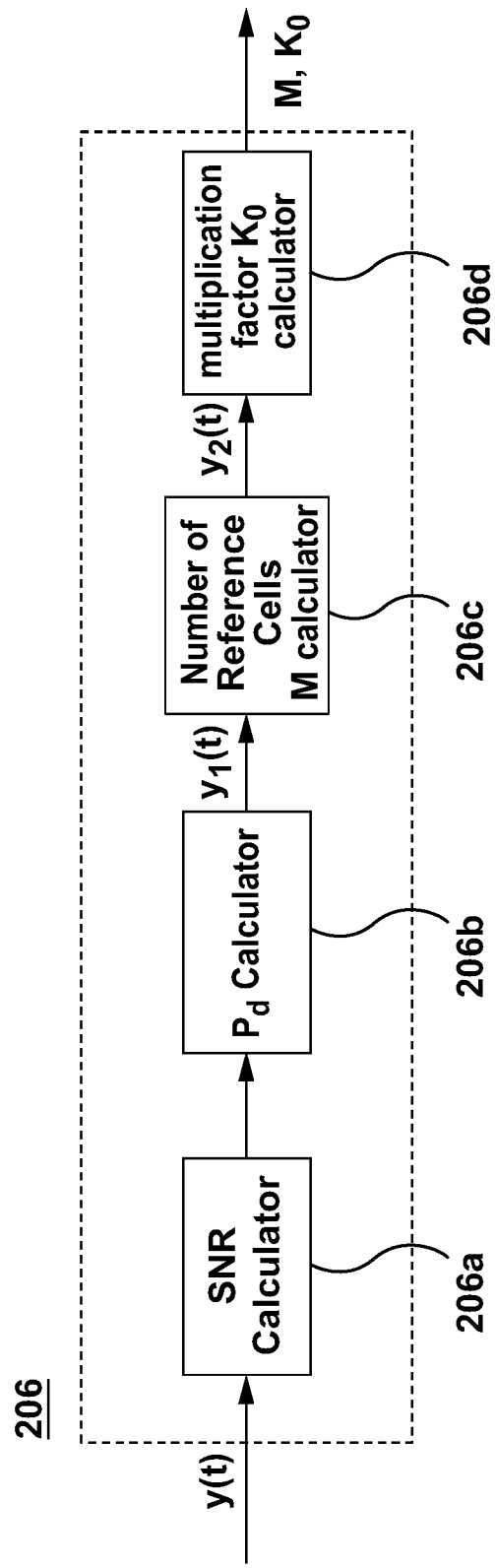
FIG. 7 depicts a high-level functional block diagram corresponding to the number of reference cells calculator module, in accordance with various embodiments discussed in present disclosure.

FIG. 7 depicts a high-level functional block diagram corresponding to the parameter extractor 206, in accordance with various embodiments discussed in present disclosure. As shown, the parameter extractor 206 employs a SNR calculation module 206a, a probability of detection ($P_d$) calculation module 206b, a number of reference cells M calculation module 206c, and a multiplication factor $K_0$ calculation module 206d. It will be understood that other elements may be present, but are not illustrated for the purpose of tractability and simplicity.

The SNR calculation module 206a receives echo signal y(t) and is configured to compute the corresponding SNR. In so doing, in certain embodiments, the calculation of the SNR may be based on power of echo signal y(t). The power $P_{rx}(t)$ received echo signal y(t) may be given by following equation:

$$P_{rx}(t) = \frac{A_r \rho T_r T_t e^{-2\sigma D}}{\pi D^2} P_{tx}(t) \quad (1)$$

Where, $T_r$ is the transmittance of the receiver (Known constant), $T_t$ is the transmittance of the transmitter (Known constant), ρ is object's reflectivity (Typical value of ρ is 0.1), $A_r$ is the area of the receiver (Known constant), σ is the atmospheric extinction coefficient (Known), D is the distance of object from receiver 200 (Estimated from the timing of every sample in the return signal and hence SNR is a function of time) and $P_{tx}(t)$ is the transmitted signal power (Known).

The computed value of SNR is then forwarded to the $P_d$ calculation module 206b. The $P_d$ calculation module 206b is configured to compute the value of the probability of detection $P_d$. In certain embodiments, the calculation of $P_d$ may be based on Neyman-Pearson (NP) probability of detection. The expression for NP is given by following equation:

$$P_d = Q(Q^{-1}(P_{fa}) - \sqrt{SNR}) \quad (2)$$

Where, $P_{fa}$ is the probability of false alarm and may be a predefined value in the range of $10^{-4}$ to $10^{-6}$, Q is a Q-function in NP and the value of SNR is supplied by the SNR calculation module 206a.

The computed value of $P_d$ is then forwarded to the number of reference cells M calculation module 206c. The number of reference cells M calculation module 206c is configured to compute the value of M In certain embodiments, the calculation of M may be based on the following equations:

$$P_d = \left[1 + \frac{\left(P_{fa}^{\frac{-1}{M}} - 1\right)}{(1+SNR)}\right]^{-M} \quad (3)$$

$$M = \frac{(\ln P_{fa})^2}{2(\ln P_{fa} - (1+SNR)\ln P_d)} \quad (4)$$

$$M = \frac{2}{\frac{3}{\ln P_{fa}} + \sqrt{\left(\frac{3}{\ln P_{fa}}\right)^2 - \frac{24(\ln P_{fa} - (1+SNR)\ln P_d)}{(\ln P_{fa})^2}}} \quad (5)$$

Where equations (4) and (5) are first order and second order solutions to equation (3) respectively. It will be appreciated that other solutions with different orders may be used to compute the value of M Since SNR is a function of time and M is a function of SNR, thereby M is also a function of time.

With this said, the value of M will be lesser for objects located near the receiver 200 as compared to the value of M for objects located a longer distance from the receiver 200. As such, the SNR of received echo signal y(t) corresponding to objects located near the receiver 200 is higher as compared to the objects located a longer distance. It will be appreciated that in certain embodiments, the value of M is an even number.

The computed value of M is then forwarded to the multiplication factor $K_0$ calculation module 206d. The multiplication factor $K_0$ calculation module 206d is configured to compute the value of multiplication factor $K_0$. In certain embodiments, the calculation of $K_0$ may be based on the following equation:

$$K_0 = M\left(P_{fa}^{\frac{-1}{M}} - 1\right) \quad (6)$$

Figure 8:
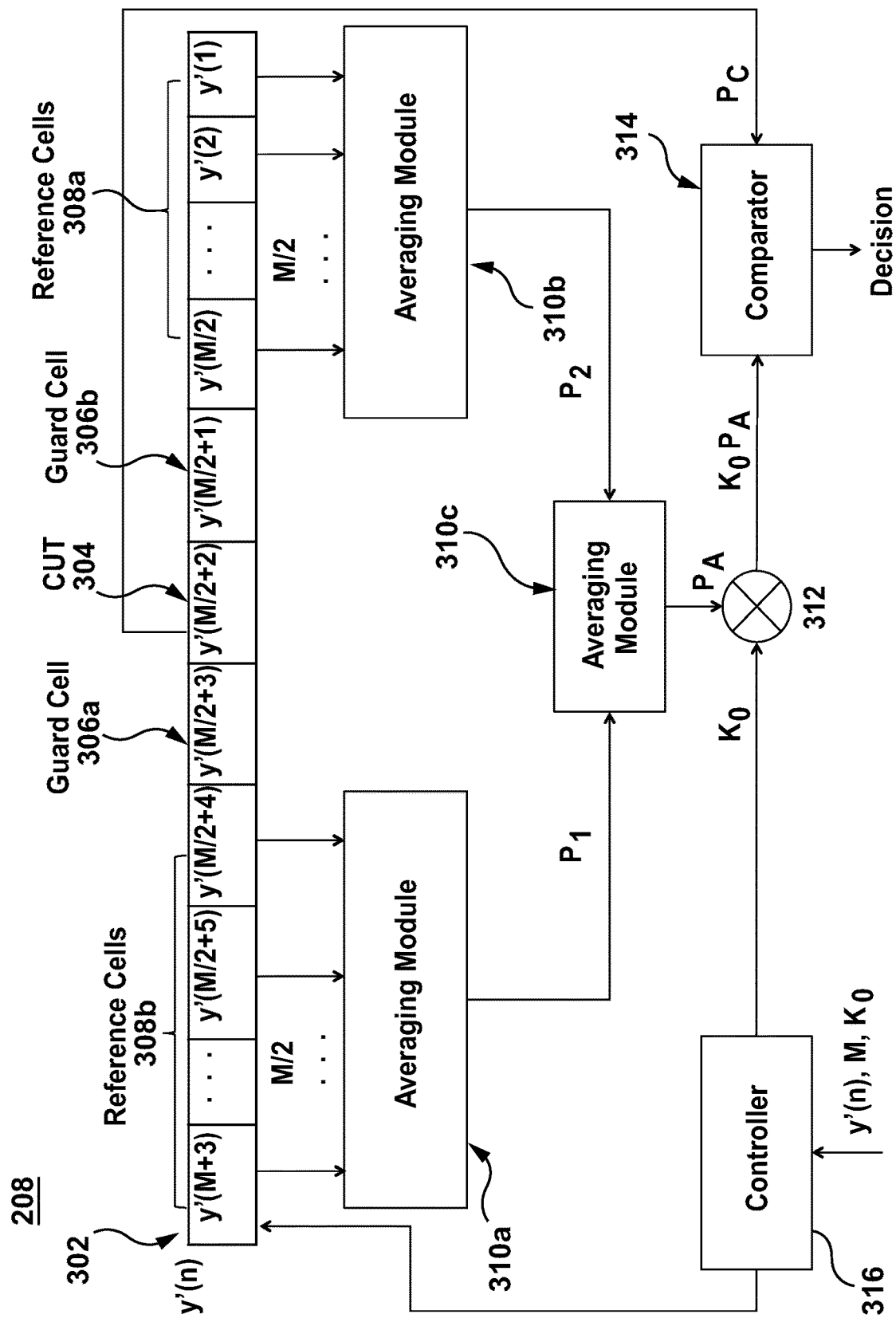
FIG. 8 illustrates a high level functional block diagram of a Constant False Alarm Rate (CFAR) processor, in accordance with various embodiments of the present disclosure.

Going back to FIG. 3, parameter extractor 206 provides the computed values of M and $K_0$ to the CFAR processor 208. The CFAR processor 208 is configured to analyze pre-processed signal y'(n) for object detection. To this end, FIG. 8 illustrates a high level functional block diagram of the CFAR processor 208, in accordance with various embodiments of the present disclosure. As shown, CFAR processor 208 employs a moving window 302 applied on the pre-processed digital signal y'(n) and provides a number of reference cells and guard cells around the CUT, averaging modules 310a, 310b, and 310c, a mixer 312, a comparator 314 and a controller 316. It will be understood that other elements may be present, but are not illustrated for the purpose of tractability and simplicity.

In certain embodiments, the controller 316 may be configured to receive the pre-processed digital signal y'(n) from the pre-processor 204, the values of M and $K_0$ from the parameter extractor 206 and may supply at least M+3 samples y'(1), y'(2), y'(3) . . . y'(M+3) in the pre-processed signal y'(n) to the moving window 302. The moving window 302 may be configured to temporarily store the M+3 samples y'(1), y'(2), y'(3) . . . y'(M+3) to be processed for object detection. In so doing, M/2 samples y'(1), y'(2), y'(M/2) and M/2 samples y'(M/2+4), y'(M/2+5), . . . y'(M+3) are reference cells 308a and 308b respectively, y'(M/2+1) and y'(M/2+3) are guard cells 306a and 306b respectively, and y'(M/2+2) is CUT 304. It will be appreciated that certain embodiments may have more than one guard cell on either side of CUT 304.

The averaging modules 310a and 310b may be configured to compute average powers $P_1$ and $P_2$ corresponding to the reference cells 308a and 308b respectively. Further, the averaging modules 310a and 310b may supply the average powers $P_1$ and $P_2$ to the averaging module 310c. The averaging module 310c may be configured to compute an overall average power $P_A$ of reference cells 308a and 308b by calculating a further average of average power $P_1$ and average power $P_2$ and may supply the computed average power $P_A$ to the mixer 312 for further processing.

The above mention operations of averaging modules 310a, 310b and 310c are based on Cell Averaging CFAR (CA-CFAR) however, it will be appreciated that averaging modules 310a, 310b and 310c may be configured to operate on any suitable averaging techniques such as, for example, Smallest of Cell Averaging CFAR (SOCA-CFAR), or Greatest of Cell Averaging CFAR (GOCA-CFAR) etc. without departing from the principles discussed in the present disclosure.

The mixer 312 may be configured to mix the average power $P_A$ with the multiplication factor $K_0$ as supplied by the controller 316 to generate a threshold $K_0 P_A$. This threshold value $K_0 P_A$ is supplied to the comparator 314. The comparator 314 may be configured to compare the power $P_C$ corresponding to CUT 304 with the threshold value $K_0 P_A$ as supplied by mixer 312. If the power $P_C$ is greater than the threshold value $K_0 P_A$, the object is detected.

Figure 9A:
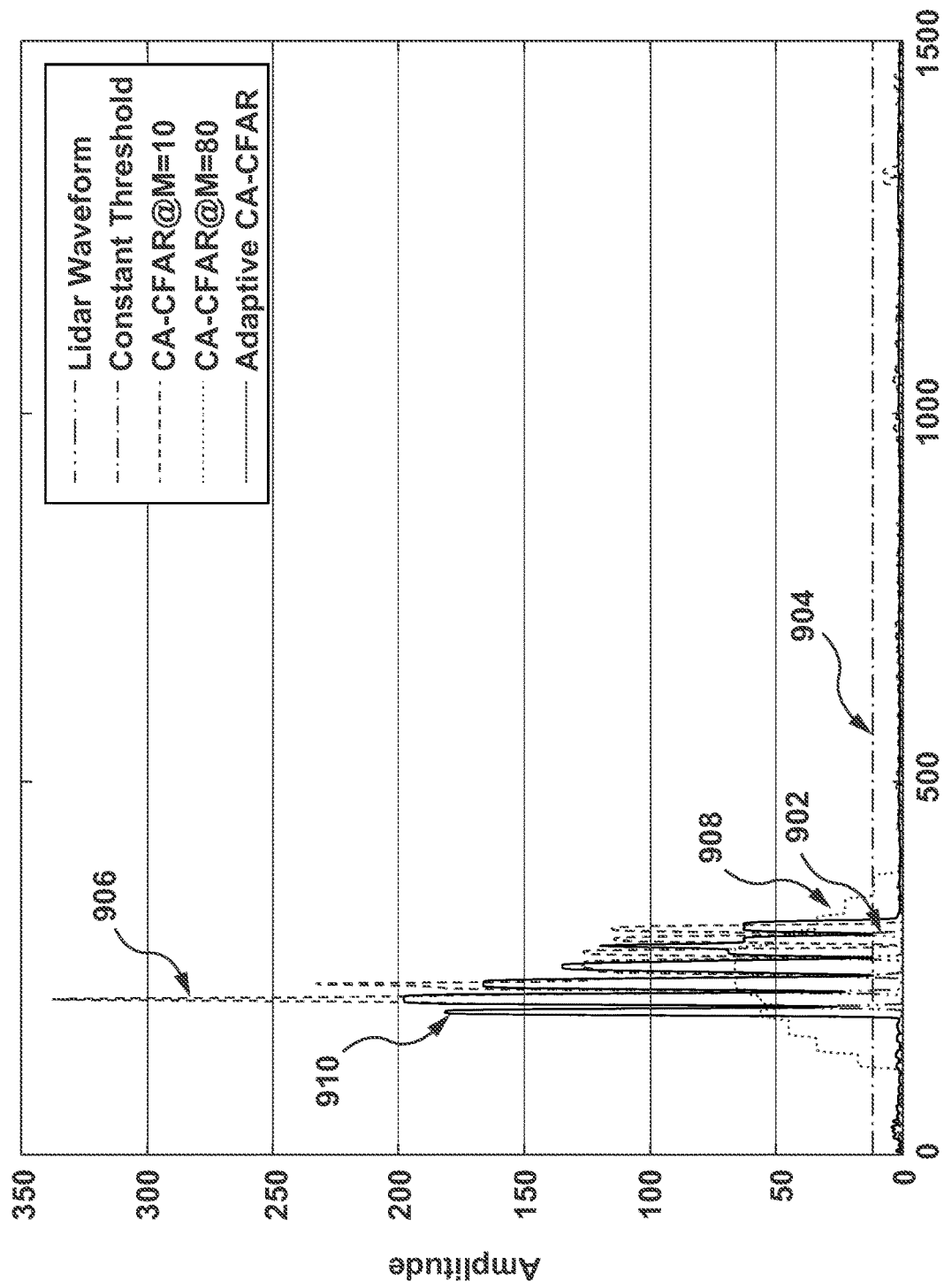
FIGS. 9a-9c illustrate representative simulation results corresponding to the pre-processed signal y'(n) processed by CFAR processor, in accordance with various embodiments discussed in the present disclosure.
Figure 9B:
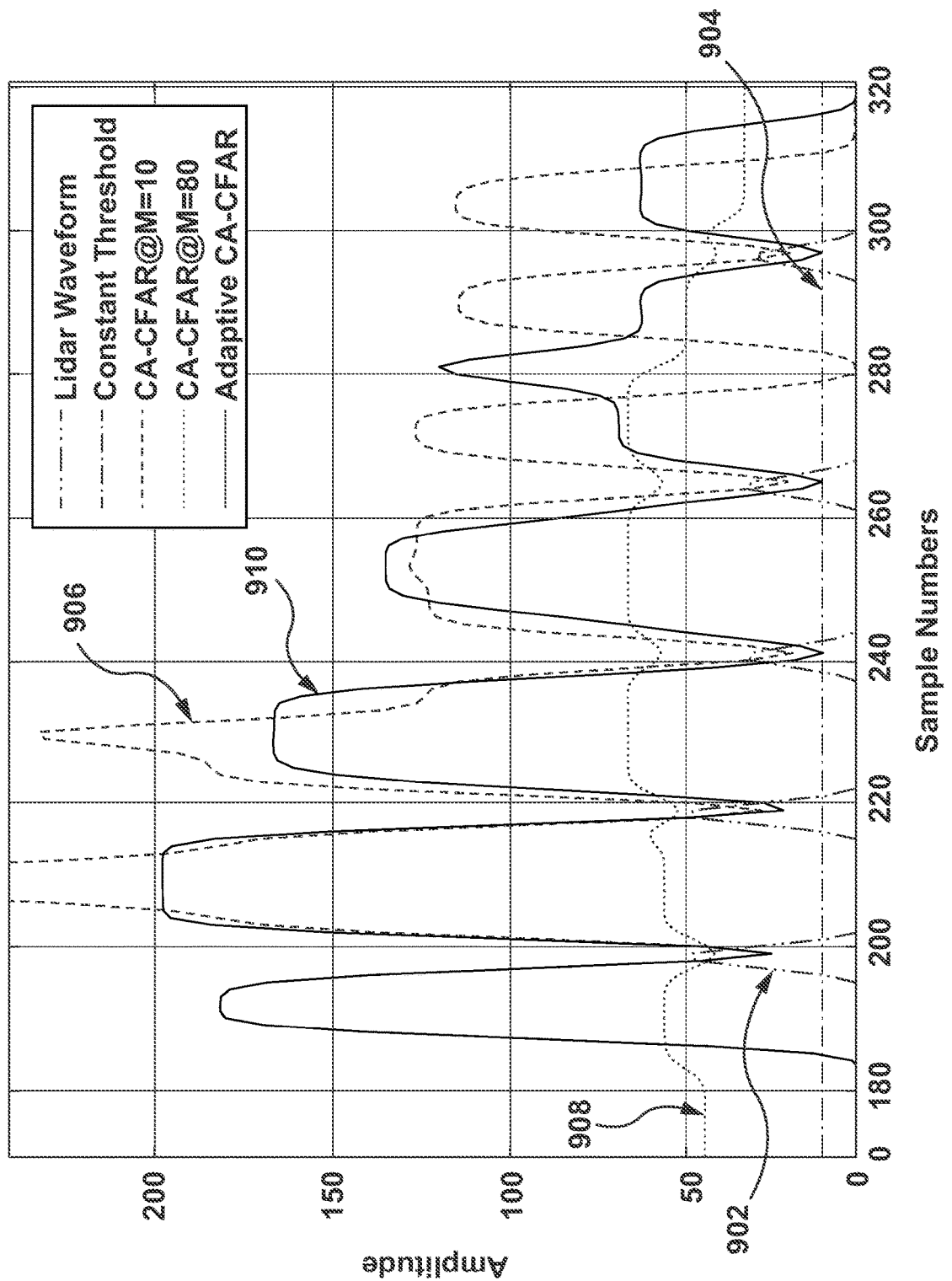
Figure 9C:
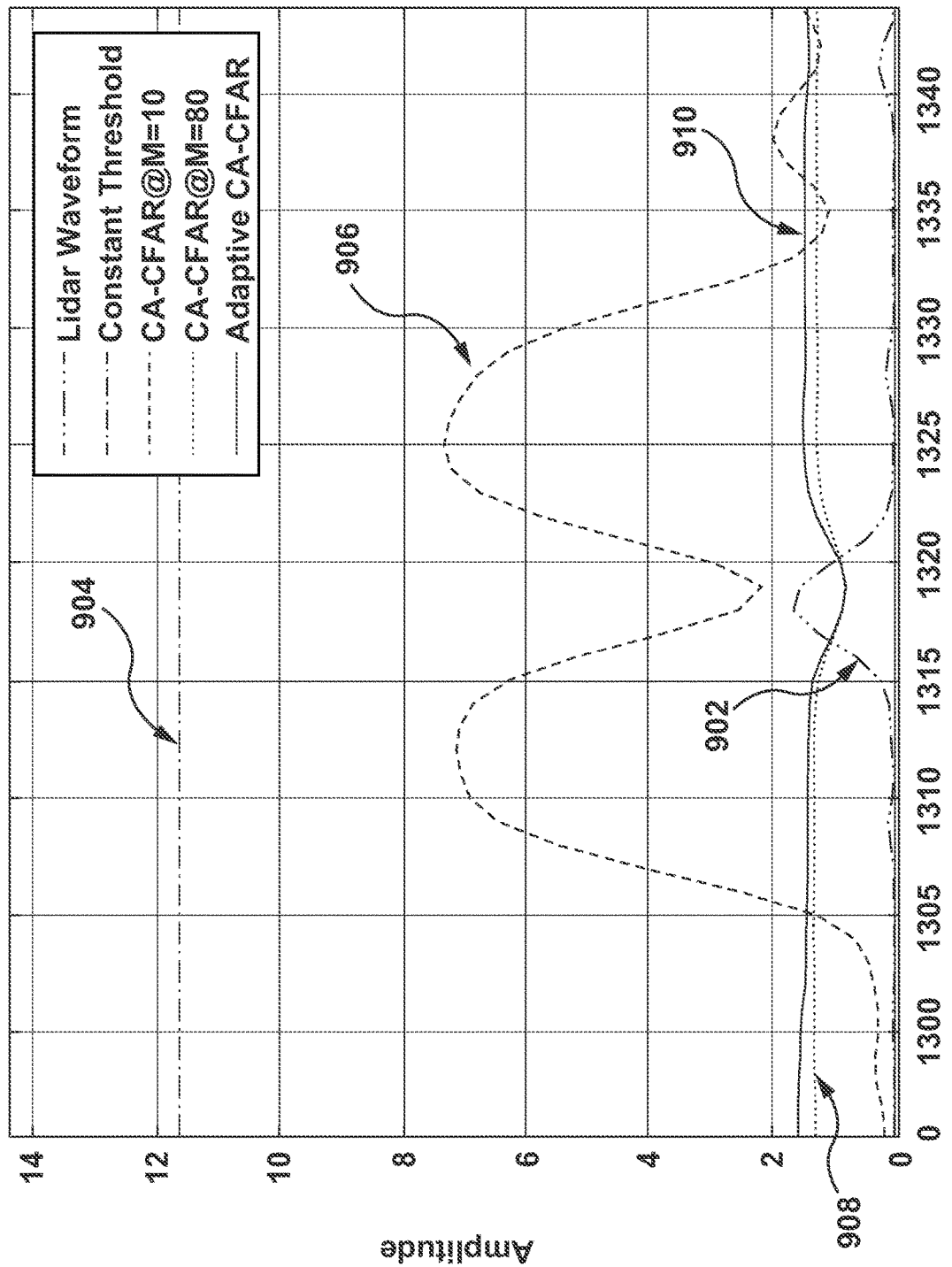

FIGS. 9a-9c illustrate representative simulation results corresponding to the pre-processed signal y'(n) processed by CFAR processor 208, in accordance with various embodiments discussed in the present disclosure. As shown, FIG. 9a illustrates a representative of pre-processed signal y'(n) 902 processed by CFAR processor 208 at various instants versus amplitude in volts corresponding to the pre-processed signal y'(n) 902. The simulation result further illustrates various detection scenarios super-imposed. Such scenarios include constant threshold 904, CA-CFAR with M equals to 10 (reference 906), CA-CFAR with M equals to 80 (reference 908), and Adaptive CA-CFAR (reference 910) for a pre-defined $P_{fa}$ equal to $10^{-6}$.

FIG. 9b illustrates a zoomed version of FIG. 9a corresponding to samples received from objects located near the receiver 200 with a higher SNR. As shown, for CA-CFAR with M equals to 80 (reference 908) or Adaptive CA-CFAR 910, the spatial resolution for closely located objects is poor as compared to the spatial resolution offered by CA-CFAR with M equals to 10 (reference 906). Similarly, FIG. 9c illustrates a zoomed version of FIG. 9a corresponding to samples received from objects located at a longer distance from receiver 200 with a lower SNR. As shown, for CA-CFAR with M equals to 10 (reference 906), the object detection with a lower SNR is poor as compared to the object detection offered by CA-CFAR with M equals to 80 (reference 908).

Thus, by virtue of techniques discussed above, the receiver 200 uses time varying value of M. As such, the receiver 200 uses a smaller value of M for detecting the short distance objects with a high spatial resolution. For example, the receiver 200 may detect a pedestrian and his/her pet as two separate objects when they are closer to the receiver 200. On the other hand, the receiver 200 uses a larger value of M for detecting the long distance objects. Therefore, the receiver 200 may detect those objects while sacrificing the spatial resolution. For example, the receiver 200 may detect a pedestrian and his/her pet as a single object when they are far from the receiver 200.

Figure 10:
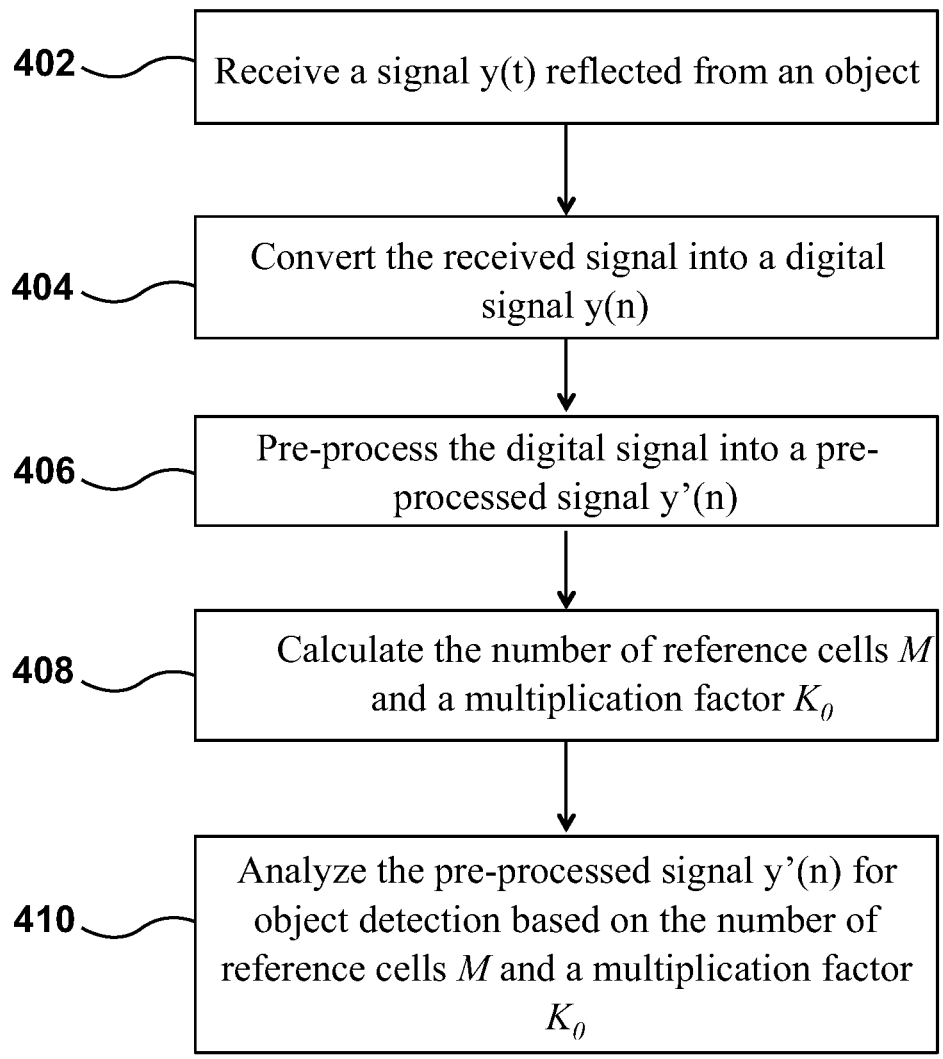
FIG. 10 depicts a functional flow diagram of a process directed to a method implemented in an object detection system, in accordance with various embodiments of the present disclosure.

FIG. 10 depicts a functional flow diagram of process 400 directed to a method implemented in an object detection system, in accordance with various embodiments of the present disclosure.

Process 400 commences at task block 402, where the receiver 200 receives an echo signal y(t). As discussed above, the optical receiver 202a receives the echo signal y(t) reflected from certain objects in the vicinity of the receiver.

Process 400 proceeds at task block 404, where the receiver 200 converts the echo signal y(t) into a digital signal y(n). As noted above, the received echo signal y(t) is forwarded to the APD 202b. The APD 202b converts the echo signal y(t) into an electrical signal $y_1(t)$ and supplies the electrical signal $y_1(t)$ to the TIA 202c. The TIA 202c amplifies the electrical signal $y_1(t)$ and provides an amplified electrical signal $y_2(t)$ to the ADC 202d. As such, the ADC 202d converts the amplified electrical signal $y_2(t)$ into a digital signal y(n), corresponding to the received echo signal y(t).

At task block 406, the receiver 200 pre-processes the digital signal y(n) to reduce the effect of noise and generate a pre-processed digital signal y'(n). As described above, the LPF 204b filters the digital signal y(n) as supplied by the ADC 202d. In so doing, LPF 204b removes the unwanted signals to improve SNR of the digital signal y(n). The filtered version of the digital signal y(n) is supplied to the square-law detector 204b. The square-law detector 204b converts the Gaussian distribution nature of noise into an exponential distribution and provides a pre-processed digital signal y'(n).

Process 400 proceeds at task block 408, where the receiver 200 calculates a number of reference cells M and a multiplication factor $K_0$. As noted above, the parameter extractor 206 computes the number of reference cells M and a multiplication factor $K_0$. In so doing, the SNR calculation module 206a receives echo signal y(t) and computes the corresponding SNR. The computed value of SNR is then forwarded to the $P_d$ calculation module 206b. The $P_d$ calculation module 206b computes the value of $P_d$.

The computed value of $P_d$ is then forwarded to the number of reference cells M calculation module 206c. The number of reference cells M calculation module 206c computes the value of M and based on computed value of M, the multiplication factor $K_0$ calculation module 206d computes the value of multiplication factor $K_0$.

Finally, at task block 410, the receiver 200 analyzes the pre-processed signal y'(n) for object detection based on the number of reference cells M and the multiplication factor $K_0$. As discussed above, the CFAR processor 208 analyzes the pre-processed signal y'(n) for object detection. In so doing, the averaging modules 310a, 310b, and 310c compute the average power $P_A$ corresponding to the reference cells 308a and 308b and the mixer 312 mixes the average power $P_A$ with the multiplication factor $K_0$ to generate a threshold value $K_0 P_A$ and comparator 314 compares the power $P_C$ corresponding to the CUT 304 with the threshold value $K_0 P_A$ to detect the object.

Thus, by virtue of techniques provided by receiver 200, an optimal value of M can be computed. Such that the overall efficiency of an object detection system incorporating receiver 200 can be improved both in terms of spatial resolutions for objects with a high SNR and capability of detection an object with a low SNR.

It is to be understood that the operations and functionality of the described receiver 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An object detection system, comprising:
   a receiver configured to receive a signal reflected from an object;
   an analog-to-digital converter (ADC) configured to convert the received signal into a digital signal;
   a pre-processor configured to improve a signal-to-noise (SNR) of the digital signal and to generate a pre-processed signal corresponding to the digital signal;
   a parameter extractor configured to:
      compute a SNR corresponding to the received signal,
      compute a probability of detection $P_d$ in accordance with the SNR and a probability of false alarm $P_{fa}$,
      compute a number of reference cells M in accordance with the probability of detection $P_d$, the probability of false alarm $P_{fa}$ and the SNR, and
      compute a value of the multiplication factor $K_0$ in accordance with the probability of false alarm, SNR and the number of reference cells M; and
   a Constant False Alarm Rate (CFAR) processor configured to analyze a cell-under-test (CUT) and M reference cells in accordance with the number of reference cells M and the multiplication factor $K_0$ to detect the presence of the object.

2. The object detection system of claim 1, wherein the pre-processor further comprising a low-pass filter and a square-law detector.

3. The object detection system of claim 1, wherein the CFAR processor is configured to:
   compute an average power $P_A$ corresponding to the M reference cells;
   mix the average power $P_A$ with the multiplication factor $K_0$ and to generate a threshold value $K_0 P_A$;
   compare the threshold value $K_0 P_A$ with a power $P_C$ corresponding to the CUT; and
   detect the presence of object if the power $P_C$ is greater than the threshold value $K_0 P_A$.

4. The object detection system of claim 1, wherein the CFAR processor comprises a controller configured to supply at least M+3 samples associated with the pre-processed signal to a moving window.

5. The object detection system of claim 4, wherein the controller is further configured to provide the multiplication factor $K_0$ to a mixer.

6. An object detection method, comprising:
   receiving a signal reflected from an object;
   converting the received signal into a digital signal;
   pre-processing the digital signal and generating a pre-processed signal corresponding to the digital signal;
   computing a signal-to-noise (SNR) corresponding to the received signal;
   computing a probability of detection $P_d$ in accordance with the SNR and a probability of false alarm $P_{fa}$;
   computing the number of reference cells M in accordance with the probability of detection $P_d$, probability of false alarm $P_{fa}$ and SNR;
   computing the value of the multiplication factor $K_0$ in accordance with the probability of false alarm, SNR and the number of reference cells M; and
   analyzing a cell-under-test (CUT) and M reference cells in accordance with the number of reference cells M and the multiplication factor $K_0$ to detect the presence of the object.

7. The method of claim 6, wherein the pre-processing of the digital signal includes filtering.

8. The method of claim 6, wherein the pre-processing of the digital signal includes processing the digital signal in a square-law detector.

9. The method of claim 6, wherein the number of reference cells M is computed according to following relationship:

$$P_d = \left[1 + \frac{\left(P_{fa}^{\frac{-1}{M}} - 1\right)}{(1 + SNR)}\right]^{-M}$$

10. The method of claim 9, wherein a first order solution for the number of reference cells M is given by:

$$M = \frac{(\ln P_{fa})^2}{2(\ln P_{fa} - (1 + SNR)\ln P_d)}$$

11. The method of claim 9, wherein a second order solution for the number of reference cells M is given by:

$$M = \frac{2}{\frac{3}{\ln P_{fa}} + \sqrt{\left(\frac{3}{\ln P_{fa}}\right)^2 - \frac{24(\ln P_{fa} - (1 + SNR)\ln P_d)}{(\ln P_{fa})^2}}}$$

12. The method of claim 6, wherein the number of reference cells M is a time varying value.

13. The method of claim 6, wherein the multiplication factor $K_0$ is computed according to following relationship:

$$K_0 = M\left(P_{fa}^{\frac{-1}{M}} - 1\right)$$

14. The method of claim 6, wherein the analyzing the cell-under-test (CUT) and M reference cells further comprises:
   computing an average power $P_A$ corresponding to the M reference cells;
   mixing the average power $P_A$ with the multiplication factor $K_0$ to generate a threshold value $K_0 P_A$; and comparing the threshold value $K_0P_A$ with a power $P_C$ corresponding to the CUT.

15. The method of claim 14, further comprising supplying at least M+3 samples associated with the pre-processed signal to a moving window.

16. The method of claim 14, further comprising detecting the object if the power $P_C$ is greater than the threshold value $K_0P_A$.

* * * * *